Patented Sept. 21, 1954

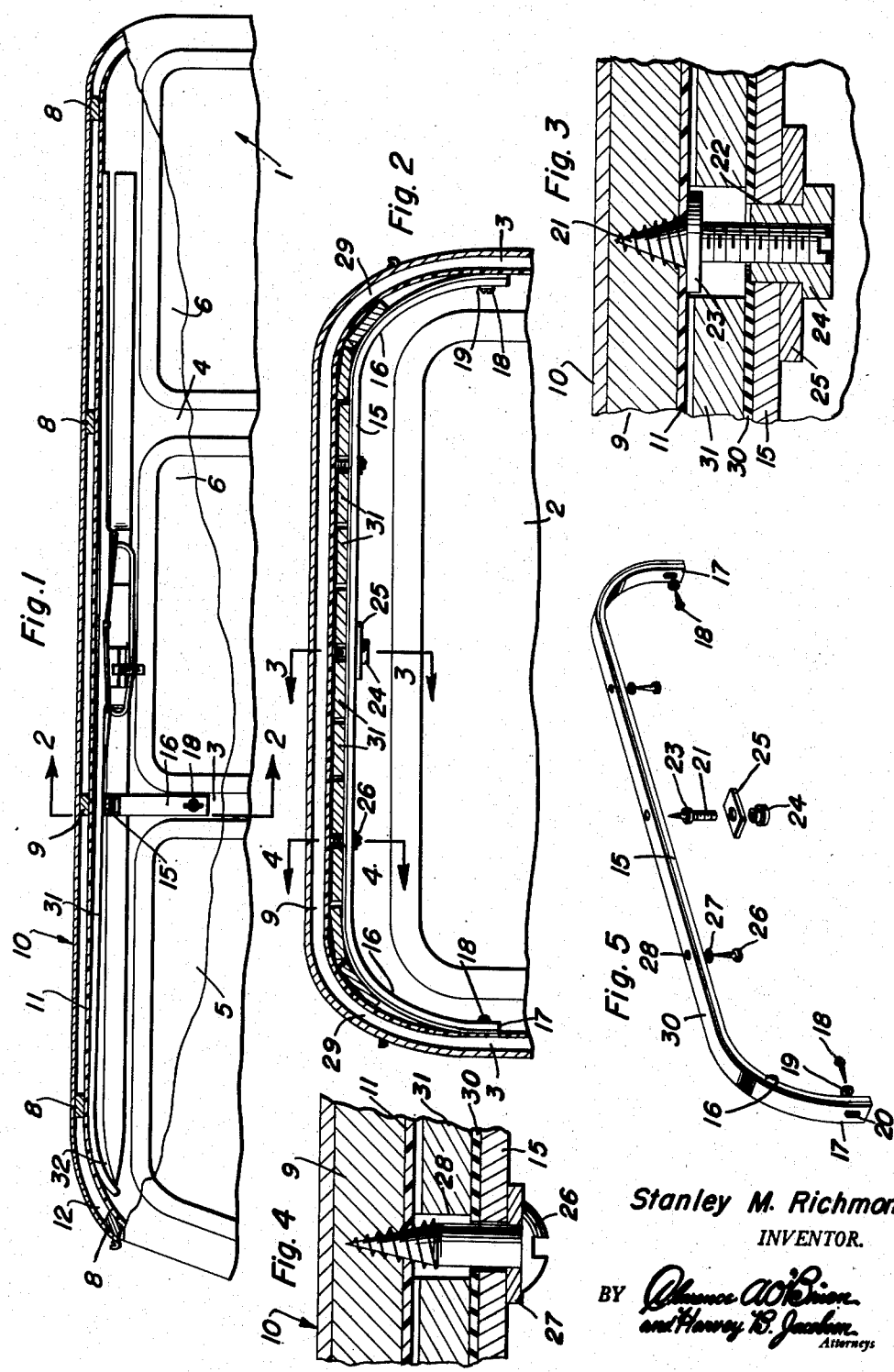

2,689,673

UNITED STATES PATENT OFFICE 2,689,673

SKI RACK FOR AUTOMOBILES

Stanley M. Richmond, Eugene, Oreg.

Application July 13, 1951, Serial No. 236,598

1 Claim. (Cl. 224—42.1)

My invention relates to improvements in ski racks for carrying skis in automobiles, especially, although not necessarily station wagons.

By way of premise, ski racks for transporting skis by automobile are usually placed on top or at the side of the vehicle and thereby expose, enroute, the skis to dust, rain and ice which gathers in small cracks and underlinings and fittings of the skis and hastens the deterioration of the same.

Having the foregoing in mind, the primary object of my invention is to provide a simple form of easily applied rack attachable inside of an automobile, especially a station wagon, to carry a large number of skis inside the body of the automobile in over head, out of the way, safe and protected position, and so that the skis may be loaded into the body in racked position through the rear door or window of the vehicle.

Other and subordinate objects, within the purview of my invention, together with the precise nature of my improvements will be readily understood when the succeeding description and claim are read with reference to the drawing accompanying and forming part of the specification.

In said drawing:

Figure 1 is a fragmentary view partly in longitudinal section and partly in side elevation of a station wagon body having my improved ski rack attached therein;

Figure 2 is a view in vertical transverse section taken on the line 2—2 of Figure 1 and drawn to a larger scale;

Figure 3 is a view in vertical longitudinal section taken on the line 3—3 of Figure 2 and drawn to a larger scale;

Figure 4 is a similar view taken on the line 4—4 of Figure 2, and

Figure 5 is an exploded view in perspective of the rack bar and means for attaching the same.

Referring to the drawing by numerals, in the preferred embodiment of my invention illustrated therein, 1 designates the body of a conventional station wagon having a rear door 2, forward and rear frame uprights 3, 4 between front and rear windows 5, 6 and connected by top bows 8, 9 extending between the top 10 of the body 1 and the inner upholstery layer or sheet 11. As is usual, one of the bows, that designated 9, is vertically aligned with the front uprights 3 and the top 10 has a downwardly sloping front 12. These features are utilized to advantage in the practice of my invention in a manner presently described.

According to my invention, a ski rack is provided comprising a flat metal bar 15, of any suitable width, formed with outwardly curved downturned end portions 16 having vertically straight terminals 17 fitting between the forward uprights 3. The rack bar 15 is attached to the uprights 3 transversely of the body 1 in underlying, vertically spaced, opposite relation to the bow 9 and by the following means.

A pair of terminal screws 18, with washers 19 thereon, are extended through vertical slots 20 in the terminals 17 so that said bar 15 is vertically adjustable on the uprights 3. A kerfed center screw 21 is extended through a center opening 22 in the bar 15 and turned into the bow 9 with a collar 23 thereon adapted to bear against the layer or sheet 11. A cylindrical headed nut 24 threaded on to the screw 21 and fitting in the opening 22 with a washer 25 bearing against the bar 15 provides for adjusting the bar 15 vertically. A pair of guide screws 26 between the center screw 21 and the screws 18 and having washers 27 thereon slidably extend through openings 28 in the bar 15 and are turned into the bow 9. The end portions 16 of the bar 15 are preferably curved in an arc of a radius greater than the curved longitudinal edges 29 of the top 10 to space the same from said edges for a purpose presently apparent.

Preferably a rubber coating or layer 30, or some other soft resilient material is provided on top of the bar 15 to be opposed to skis 31 positioned between said bar and the sheet 11, which is to say the top 10.

Referring now to the use and operation of the invention, with the terminal screws 18 loosened, the nut 24 is unscrewed so that the bar 15 will drop on the screws 18 and 26 sufficiently to accommodate skis 31 between the same and the layer 11, or top. The skis 31 are inserted through the rear door 2, toe 32 foremost, on top of said bar 15, side-by-side, to extend longitudinally of the body 1 and are preferably pushed forwardly until the toes thereof bear against the downwardly sloping front 12 of the top 10. The nut 24 is then tightened to adjust the bar 15 upwardly on the screws 18, 26, which will cause said skis, that is the cambered parts thereof, to be clamped between the bar 15 and the layer 11, or bow 9.

As will be seen, when the skis 31 are racked in the manner described, they will occupy unused space in the top 1, are hidden from view from the outside of the vehicle, protected against damage from the weather, and are held securely against rattling and in a position to be easily removed through the rear door or window 2 when the screw 21 is loosened so as to permit the bar 15 to drop downwardly. If desired, when the bar is adjusted upwardly to clamp the same against the skis 31, the terminal screws 18 may be tightened to additionally secure the bar 15 in clamping position.

The foregoing will, it is believed, suffice to impart a clear understanding of my invention, without further explanation.

Manifestly, the invention, as described, is susceptible of modification, without departing from the inventive concept, and right is herein reserved to such modifications as formed in the scope of the appended claim.

Having described my invention, what is claimed as new is:

A ski rack comprising the combination with a top bow of an automobile body and supporting uprights for the ends of the bow, of a rack bar beneath and extending along said bow and having downturned ends, slot and screen devices slidably connecting said downturned ends to said uprights for upward adjustment of said rack bar relative to said bow to clamp skis between said bow and rack bar and limited downward adjustment of the rack bar by gravity to release the skis, screw feed means depending from said bow through the center of said bar for adjusting said rack bar upwardly and including a headed nut rotatable in said rack bar with a washer thereon between the head thereof and said rack bar, and guide members depending from said bow and slidable through said rack bar for guiding said rack bar during adjustment thereof.

References Cited in the file of this patent

UNITED STATES PATENTS

| Number | Name | Date |
| --- | --- | --- |
| 1,511,864 | Altmyer | Oct. 14, 1924 |
| 2,192,038 | Hansen | Feb. 27, 1940 |
| 2,232,094 | Canfield | Feb. 18, 1941 |
| 2,242,391 | Daniels | May 20, 1941 |
| 2,253,423 | Fellers et al. | Aug. 19, 1941 |
| 2,493,158 | Mitchell | Jan. 3, 1950 |
| 2,528,794 | Seidler | Nov. 1, 1950 |
| 2,552,293 | Page et al. | May 8, 1951 |
| 2,575,458 | Merrill | Nov. 20, 1951 |
| 2,599,824 | Griffin | June 10, 1952 |